United States Patent [19]

Kitamura

[11] 4,423,426

[45] Dec. 27, 1983

[54] BEAM RECORDING APPARATUS

[75] Inventor: Takashi Kitamura, Yokohama, Japan

[73] Assignee: Canon Kabushiki Kaisha, Tokyo, Japan

[21] Appl. No.: 395,183

[22] Filed: Jul. 6, 1982

Related U.S. Application Data

[63] Continuation of Ser. No. 164,522, Jul. 2, 1980, abandoned.

[30] Foreign Application Priority Data

Jul. 6, 1979 [JP] Japan .................................. 54-85664

[51] Int. Cl.³ ............................................. G01D 15/14
[52] U.S. Cl. .................... 346/108; 350/6.8; 358/285
[58] Field of Search ...................... 346/108, 76 L, 160; 354/5; 350/6.8; 358/302, 296, 293, 285

[56] References Cited

U.S. PATENT DOCUMENTS

| | | | |
|---|---|---|---|
| 3,999,010 | 12/1976 | Oosaka | 346/76 L X |
| 4,000,493 | 12/1976 | Spaulding | 346/108 X |
| 4,059,833 | 11/1977 | Kitamura | 346/108 |
| 4,253,102 | 2/1981 | Kataoka | 346/108 |

Primary Examiner—Joseph W. Hartary
Attorney, Agent, or Firm—Fitzpatrick, Cella, Harper & Scinto

[57] ABSTRACT

A beam recording apparatus in which a recording medium is simultaneously scanned by plural beams respectively modulated by recording signals, and a detection signal is generated upon arrival of a particular one of the plural beams at a determined position and is delayed to form the position signals for other beams.

6 Claims, 12 Drawing Figures

BEAM RECORDING APPARATUS

This is a continuation, of application Ser. No. 164,522, filed July 2, 1980, now abandoned.

BACKGROUND OF THE INVENTION

1. Field of the Invention

The present invention relates to a beam recording apparatus in which a recording member is scanned by plural beams to record the traces of beam irradiation on said recording member.

2. Description of the Prior Art

In the conventional apparatus for information recording on the recording medium by means of successive scanning thereon with a single beam, the transmission speed of the information signals for modulating the beam has to be increased for a high-speed recording. Also there is required a faster scanning function which may correspond to several ten thousand revolutions per minute of the polygonal rotary mirror if the scanning function is achieved by such a mirror. For this reason such recording apparatus has a structural limitation in the high-speed recording.

In order to avoid such drawback there has been proposed a recording apparatus, in which, as disclosed in the U.S. Pat. No. 4,000,493, a recording medium is simultaneously scanned by plural beams respectively modulated with recording signals.

Figures 1A, 1B:
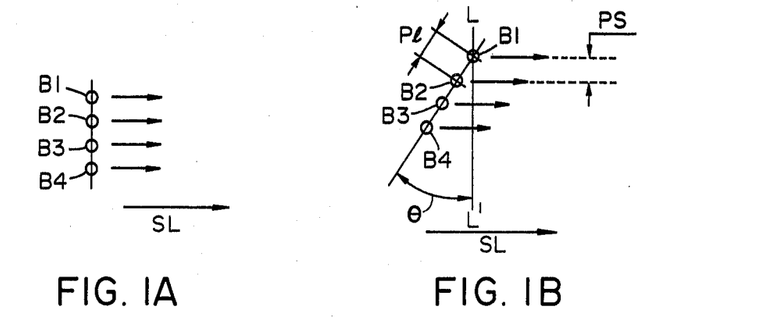
FIGS. 1A and 1B are elevation views showing beam arrangements.

In such apparatus, the position of all the beams can be easily detected from the position of any one beam if all the beams B1–B4, as shown in FIG. 1A, are positioned perpendicular to the beam scanning direction SL, whereby the control for example for the start of modulation can be significantly facilitated.

However in such perpendicular arrangement of beams with respect to the scanning direction or line SL the distance of the beams has to be equal to and thus gives a limitation to the distance of pixels to be formed on the recording medium.

On the other hand, as shown in FIG. 1B, a beam distance Pl larger than the pixel distance Ps is permissible if the beams are inclined by an angle $\theta$ with respect to a line L—L' perpendicular to the scanning direction, but the characters etc. appear in inclined abnormal form if the conventional beam modulation control is applied to such beams of inclined arrangement.

SUMMARY OF THE INVENTION

The object of the present invention, therefore, is to provide a beam recording apparatus capable of correct recording with plural beams.

Another object of the present invention is to provide a beam recording apparatus capable, in recording with plural beams of inclined arrangement, of performing compensation corresponding to the beam inclination.

Still another object of the present invention is to provide a beam recording apparatus capable of exact modulation control for beams.

Still another object of the present invention is to provide a beam recording apparatus capable of forming, from the position signal of a beam, plural standard signals for controlling other beams.

DESCRIPTION OF THE PREFERRED EMBODIMENTS

Figure 2A:
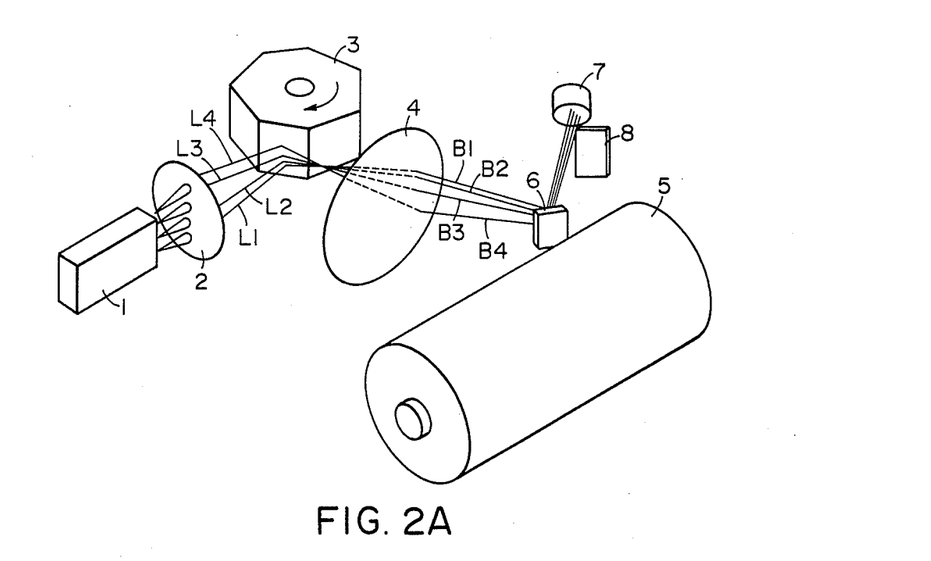
FIG. 2A is a perspective view of a recording apparatus.
Figure 3:
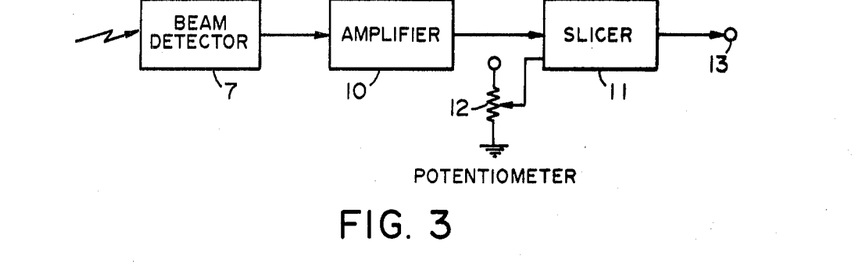
FIG. 3 is a block diagram of the beam detecting circuit.
Figure 4:
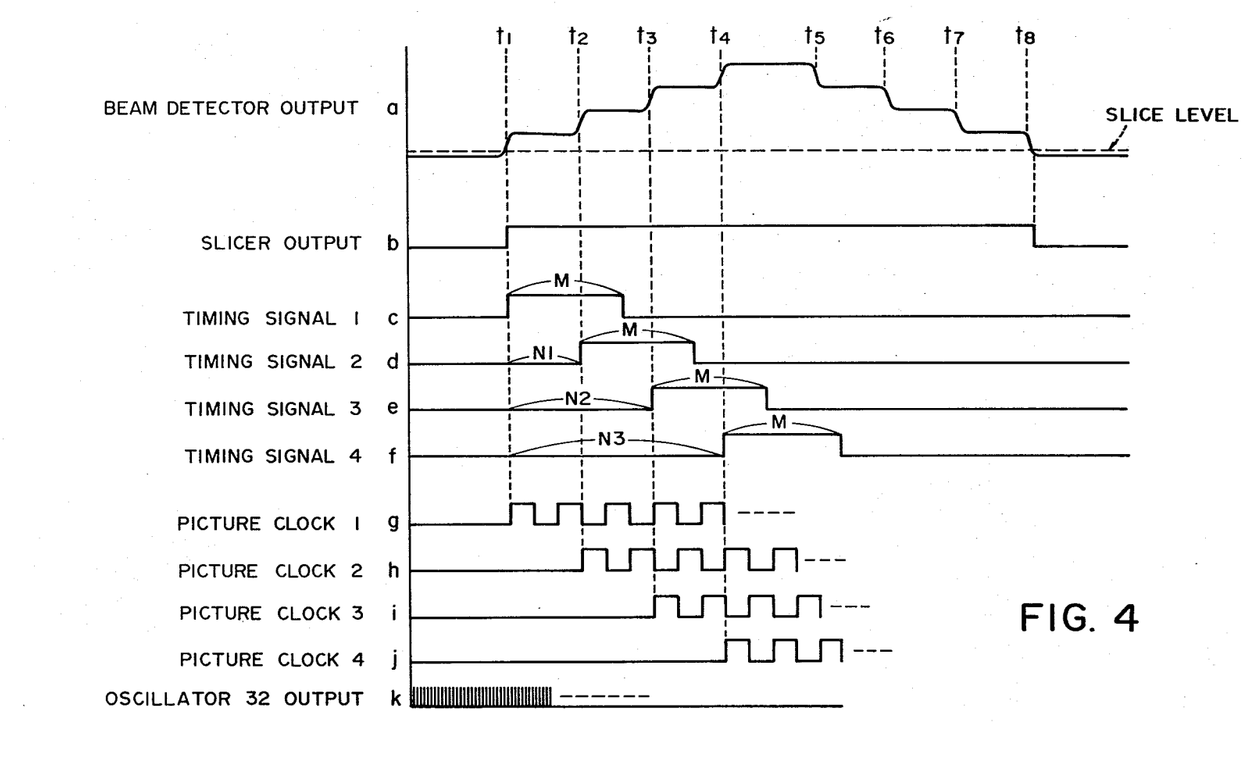
FIG. 4 is a waveform chart showing various signals in the recording apparatus.

FIG. 2A illustrates an embodiment of the recording apparatus of the present invention, in which there are shown a light source unit 1 for example a semiconductor laser array having plural semiconductor lasers arranged in a line; a condenser lens 2 for converting the diverging beams from said light source unit into parallel beams L1, L2, L3 and L4; a rotary polygonal mirror 3 for causing scanning motions of said parallel beams L1, L2, L3 and L4 on a photosensitive drum 5; and F-$\theta$ lens 4 for focusing the scanning beams emerging from said rotary polygonal mirror onto the photosensitive drum 5; a mirror 6 positioned at the start end of scanning lines for leading plural scanning beams to a beam detector 7; and a light-shield plate 8 provided for enabling exact detection of the beam position. When the beam crosses the edge of the light-shield plate 8, the beam detector 7 is suddenly exposed to said beam to generate a corresponding electric output signal, which is amplified by an amplifier 10 as shown in FIG. 3 and level sliced by a slicer 11 at a level determined by a potentiometer 12, to provide a sliced output signal from a terminal 13. The beam detector 7 is provided with a photosensor element of which light-receiving aperture in the present embodiment is of a size capable of simultaneously receiving all the beams, whereby the beams are integrated to provide the output waveform as shown in FIG. 4A. However it is not necessarily essential to receive all the beams simultaneously. Thus, if the beam directed to the photosensitive drum 5 are arranged as shown in FIG. 1B, t1, t2 and t3 respectively show the times at which the beams B1, B2 and B3 start to enter the beam detector 7, while t4–t5 indicates the period in which all the beams B1–B4 are received by the detector 7.

The beams B1, B2, B3 and B4 leave the beam detector 7 in succession respective at t5, t6, t7 and t8 after which the beam detector 7 receives no beam.

In the present embodiment the leading end of the beam first entering the beam detector 7 is detected to form a detection signal, from which a position signal corresponding to other beams as shown in FIGS. 4C to 4F is derived.

The above-explained function will be further clarified in the following description while making reference to FIG. 5.

The sliced output signal (FIG. 4B) from the terminal 13 (FIG. 3) is supplied to a terminal 30 as a clear signal for a counter 31, which performs the counting operation only during the high-level state of said signal. Said counter 31 counts the clock signals as shown in FIG.

4K supplied from a crystal oscillating circuit 32, of which oscillating frequency f1 is selected higher than that of the image recording clock signals of the recording apparatus shown G–J in FIG. 4. As explained by the present applicant in the U.S. Pat. No. 4,059,033, the jittering of the image can be reduced by selecting a higher oscillating frequency.

The timing signal 1 shown in FIG. 4C is generated by a flip-flop 33. Upon shifting of said sliced output signal to the high-level state, the flip-flop 33 is shifted to the high-level output state, and simultaneously the counter 31 initiates the counting of the clock signals from the crystal oscillating circuit 32. The counter 31 provides parallel plural-bit output signals, which are supplied to comparators 34–40 for example composed of the element SN 7485 manufactured by Texas Instruments.

Figure 5:
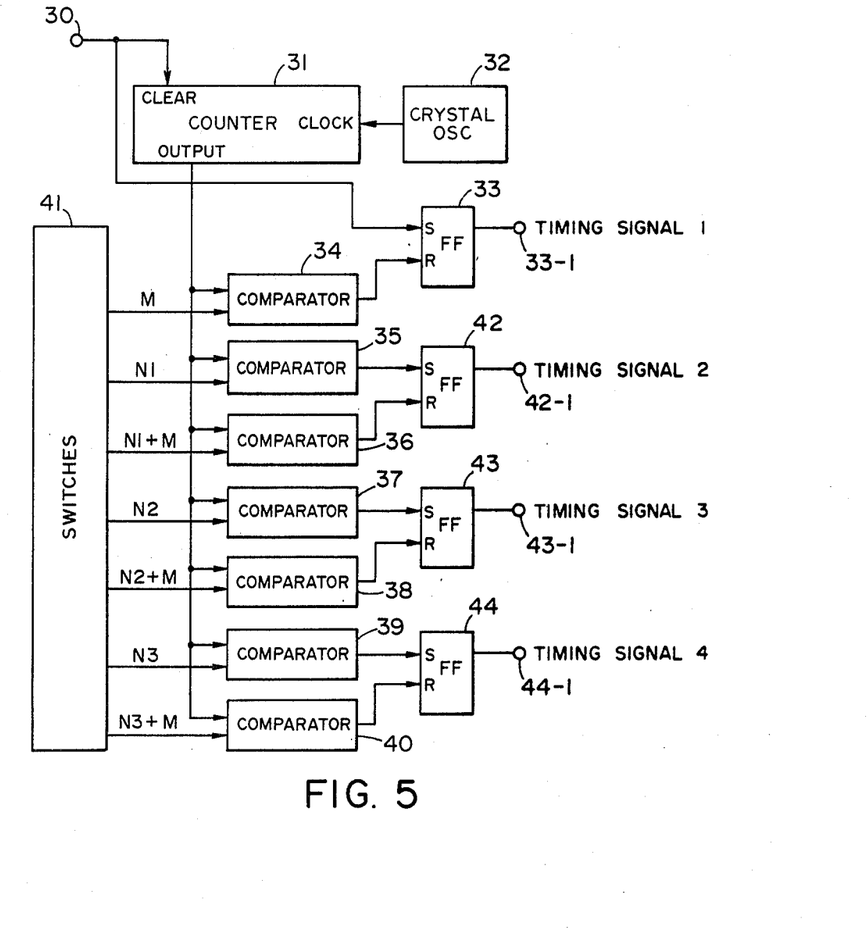
FIGS. 5 and 6 are block diagrams of the timing signal forming circuit.

The data for comparison for said comparators are preset by a switch group 41 in advance and supplied to the comparators as shown in FIG. 5. Thus, for example the comparators 34, 35 and 36 respectively receive the numbers M, N1 and M+N1.

Each comparator generates a high-level signal when the output signal of the counter 31 coincides with the preset number, to invert the state of the corresponding flip-flop.

The timing signal 1 is generated when the counter 31 counts the number M, whereupon the comparator 34 releases a coincidence output signal to reset the flip-flop 33 thereby releasing the output signal as shown in FIG. 4C.

Also upon counting of a number N1 by the counter 31 the comparator 35 releases a coincidence signal to set a flip-flop 42 while upon counting of a number N1+M by the counter 31 the comparator 36 releases a coincidence signal to reset said flip-flop 42, thereby generating a timing signal 2 as shown in FIG. 4D.

In a similar manner a flip-flop 43 is set upon counting of a number N2 by the counter 31 and reset upon counting of a number N2+M, while a flip-flop 44 is set upon counting of a number N3 by the counter 31 and reset upon counting of a number N3+M.

The timing signals 1 to 4 are required to have exactly defined leading ends but the pulse duration may be suitably selected. However, the pulse duration has to be constant in case the trailing ends of the pulses are to be utilized. Said leading ends have to coincide with the leading ends of the stepwise signal shown in FIG. 4A. This can be achieved by the adjustments of the preset values N1–N3 in the switch group 41 while showing the signal of FIG. 4A and the timing signals 2 to 4 on an oscilloscope.

Although the picture clock signals shown in FIG. 4 appear mutually correlated in phase, such correlation may be lost since, as will be made apparent later in relation to FIG. 9, said picture clock signals are by starting the counting of the output signals from the oscillator 32 at the times t1–t4.

When the beams pass completely through the beam detector 7, the slicer output signal (FIG. 4B) is shifted to the low-level state, whereby the counter 31 is cleared and terminates the counting operation. In the present embodiment the duration of the timing signals is controlled by the use of the flip-flops 33, 42, 43 and 44, but it is also possible to utilize one-shot multivibrators to eliminate the resetting flip-flops and the comparators 34, 36, 38 and 40 for resetting.

Figures 6, 8:
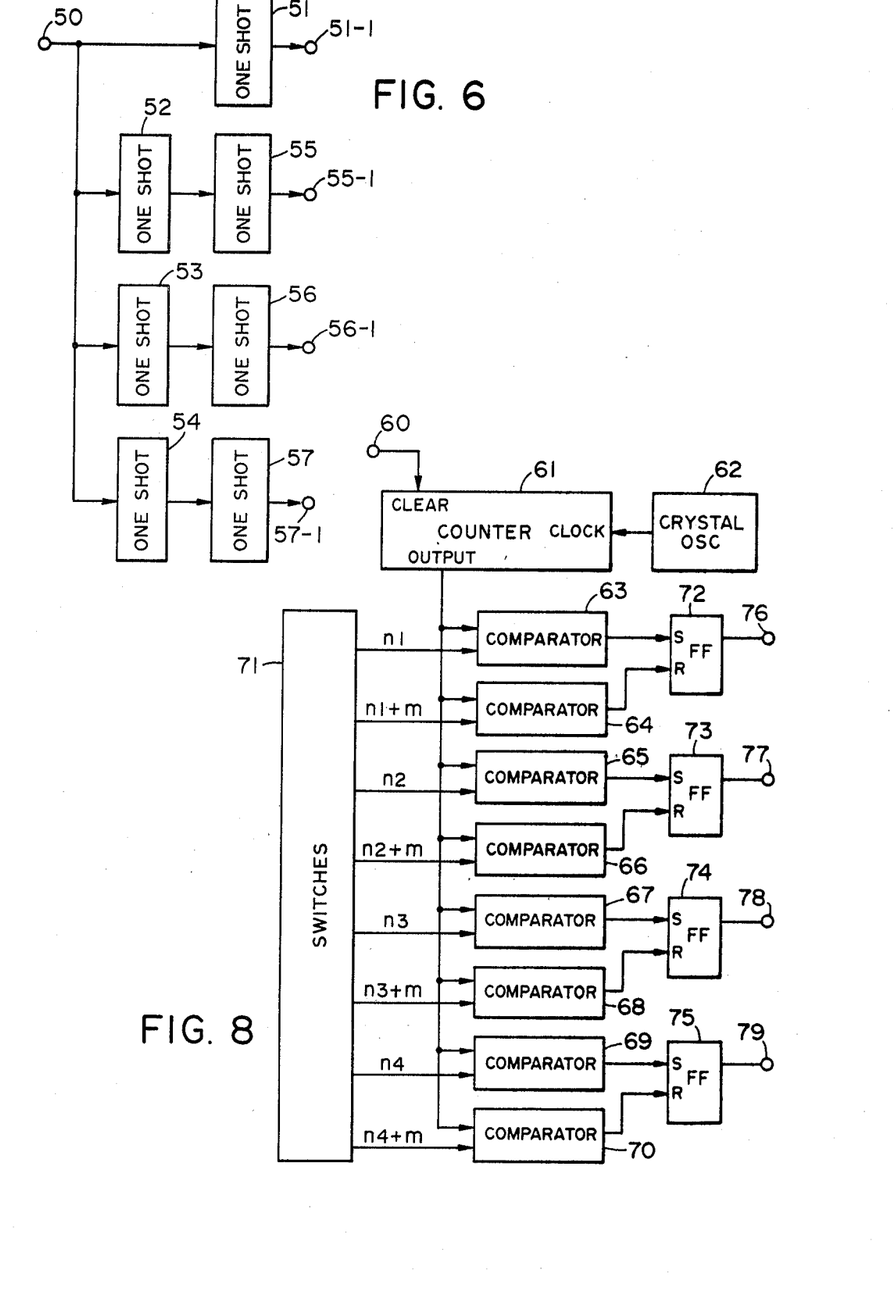
FIG.8 is a block diagram of the timing signal forming circuit.

Also in the present embodiment the signal delaying is achieved by the counter 31, it is naturally possible also to achieve signal delaying by the use of plural one-shot multivibrators, as in the embodiment shown in FIG. 6.

In FIG. 6, the slicer output signal (FIG. 4B) received at a terminal 50 triggers a one-shot multivibrator 51 for generating the timing signal 1 and one-shot multivibrators 52–54 for signal delaying. The output of said one-shot multivibrator 51 is utilized as the timing signal 1 (FIG. 4C).

Said slicer output signal, after delays by the one-shot multivibrators 52–54 respectively corresponding to N1, N2 and N3 shown in FIG. 4, triggers one-shot multivibrators 55–57 for generating timing signals as shown in FIGS. 4D, 4E and 4F.

Furthermore, said one-shot multivibrator for signal delaying may be replaced by a suitable delaying element such as an ultrasonic delay line.

Furthermore, in the foregoing explanation the timing detection is achieved by the first beam received by the beam detector 7, but it is also possible to detect the second or third beam by elevating the slicing level and to generate timing signals 2–4 by delaying such detection signal. The waveform chart in such case and the corresponding circuit block diagram are shown respectively in FIGS. 7 and 8.

Figure 7:
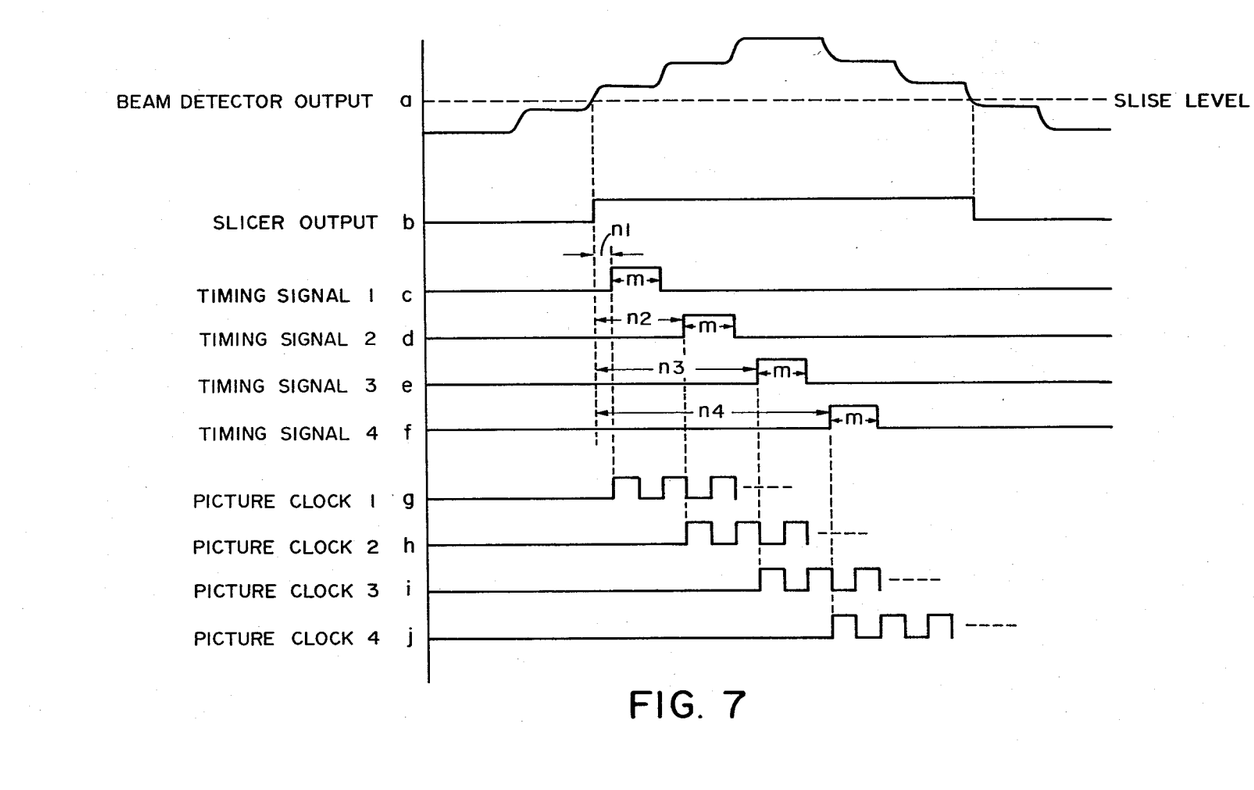
FIG. 7 is a waveform chart showing various signals in the recording apparatus.

In FIG. 7A there is shown the output signal from the beam detector 7 similar to that shown in FIG. 4A, but because of a higher slicer level, the slicer output signal assumes the form shown in FIG. 7B which is supplied to a terminal 60 in FIG. 8. In response to said signal a counter 61, similar to the counter 31, is activated to count the output pulses from a crystal oscillator 62 similar to the crystal oscillator 32. The output signal from said counter 61 is compared in comparators 63–70 with data predetermined by a switch group 71, and, upon coincidence, flip-flops 72–75 are set to reset to generate timing signals 1–4 (FIGS. 7C to F) to terminals 76–79 corresponding to the beams. The function of the circuit shown in FIG. 8 is similar to that shown in FIG. 5 and will not be explained in detail.

Figure 2B:
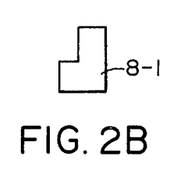
FIGS. 2B and 2C are elevation views showing light-shield plates.
Figure 2C:
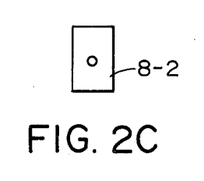

In the embodiment in which the signal delaying is achieved by the combination of one-shot multivibrators, the light-shield 8 may be of a shape as shown in FIG. 2B or 2C for allowing the entry of a particular beam into the beam detector 7. However, in case of selecting an artibrary one from multiple beams by means of a pinholed plate 8-2 as shown in FIG. 2C, it becomes necessary to insert a delaying one-shot multivibrator between the one-shot multivibrator 51 and the terminal 50 shown in FIG. 6.

Figure 9:
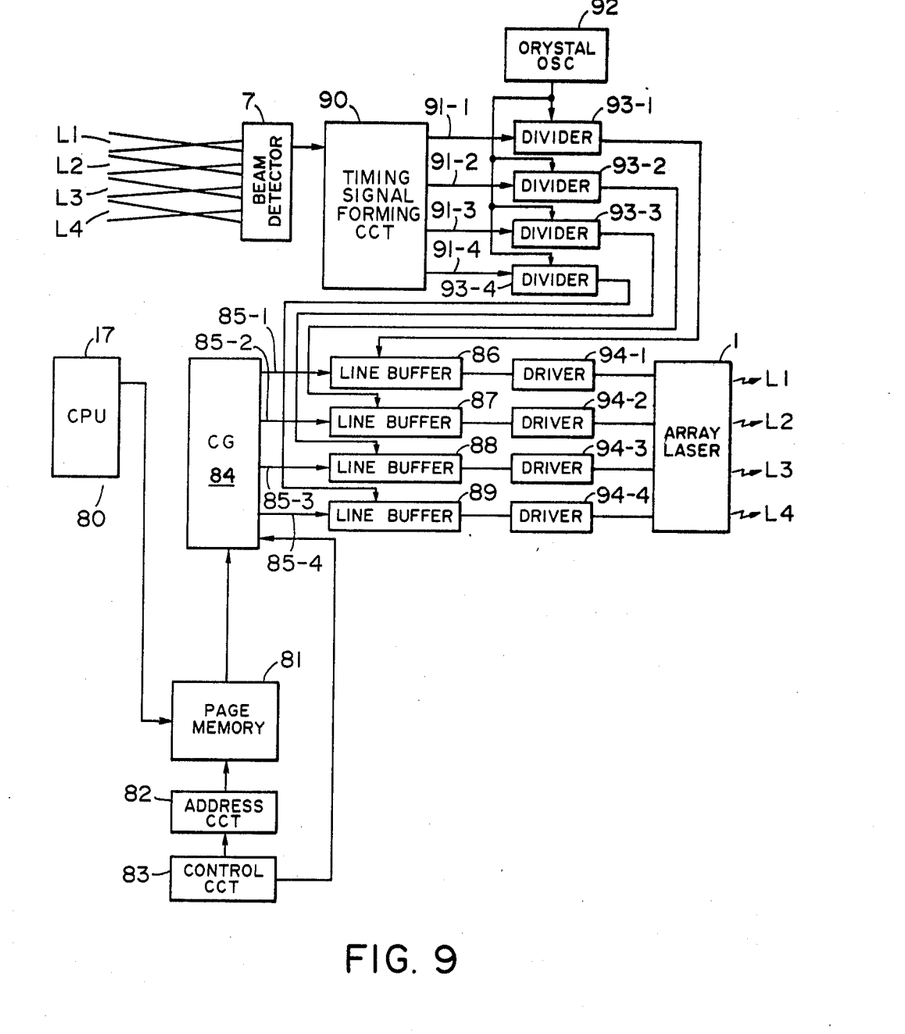
FIG. 9 is a circuit block diagram of the recording apparatus.

FIG. 9, shows, in a block diagram, the circuit for beam position detection and information processing in the recording apparatus of the present invention.

In said circuit, the character code signals read for example from a magnetic tape 80 constituting a part of a central processing unit (CPU) 17 are stored in succession into a page memory 81. Said page memory 81 performs the storage of the character code signals under the control by an address circuit 82, and is shifted from the write-in mode to the read-out mode by a control circuit 83 when the character code signals of a determined amount, corresponding to one page of the recording medium, are stored therein.

The information read-out from said page memory 81 is effected for each row, and the character code signals thus obtained are supplied in succession to a character generator 84.

Said character generator 84 stores the characters in dot matrices corresponding to the character code signals and, in response to the character code signal and a signal indicating a line, releases dot signals corresponding to said row through output lines 85. In FIG. 9 there are shown only four output lines for simplicity, but it is also possible to increase the number of beams and to correspondingly to increase the number of output lines.

The dot signals supplied on said output lines 85 are stored in succession in line buffers 86–89.

Each of the line buffers is adapted to store the dot signals constituting one of plural scanning lines constituting one character row, namely the dot signals corresponding to one scanning line.

On the other hand the aforementioned output signal from the beam detector 7 is supplied to the timing signal generating circuit 90 as shown in FIG. 5, 6 or 7 whereby the timing signals 1–4 are obtained on output lines 91-1 to 91-4.

92 is a crystal oscillator, which may be identical with the crystal oscillator 32 or 62, for generating the clock signals as shown in FIG. 4K, which are supplied to frequency divider 93 for reducing the frequency to 1/P.

Said frequency dividers 93, being adapted to initiate the dividing function in response to the timing signals, generate picture clock signals as shown in FIGS. 4G to J upon receipt of the timing signals as shown in FIGS. 4C to F supplied through the output lines 91-1 to 91-4.

Said picture clock signals are respectively supplied as read-out clock signals to said line buffers 86–89, thereby reading the dot signals stored therein in response to said picture clock signals.

The dot signals thus read are supplied respectively to driver circuits 94-1 to 94-4 for modulating the laser source, whereby the laser array 1 is driven under modulation to emit the modulated beams L1, L2, L3 and L4 respectively controlled by said drivers 94-1 to 94-4, as shown in FIG. 1. The information recording on the photosensitive drum 5 is achieved by said beams. Upon completion of the read-out of all the dot signals stored in the line buffer 86–89, the information for the succeeding lines are again read from the page memory 81.

What I claim is:

1. A beam recording apparatus, comprising:
   beam generating means for generating plural beams;
   deflecting means for deflecting the plural beams generated by said beam generating means;
   detecting means for simultaneously detecting said plural beams, deflected by said deflecting means, and for generating one detection signal;
   synchronizing signal generating means for generating plural synchronizing signals, at a plurality of respective predetermined time intervals from generation of the detection signal, in response to generation of the detection signal by said detecting means; and
   means for controlling the start of modulation of said plural beams respectively by said plural synchronizing signals.

2. A beam recording apparatus according to the claim 1, wherein the synchronizing signal generating means comprises plural delaying means.

3. A beam recording apparatus, comprising:
   beam generating means for generating plural beams;
   a beam receiving member to be irradiated by said plural beams;
   beam deflecting means for deflecting said plural beams to said beam receiving member in such a manner that the direction of the arrangement of said plural beams on said beam receiving member is not perpendicular to the direction in which said plural beams are displacing by said deflecting means;
   memory means for storing signals for modulating said plural beams;
   signal generating means for generating a standard signal upon detection of the beams deflected by said beam deflecting means to said beam receiving member and for delaying the standard signal to generate plural synchronizing signals indicating that the deflected beams are in predetermined positions;
   means for generating plural clock signals synchronized respectively with said plural synchronizing signals obtained from said signal generating means and having a second frequency lower than a first frequency of clock signals; and
   means for reading the modulating signals from said memory means respectively in response to said clock signals of said second frequency.

4. A beam recording apparatus according to the claim 3, wherein said signal generating means comprises position detecting means for detecting the arrival of a determined one of said plural beams at a determined position, and generating standard signals respectively corresponding to plural beams in response to the output signal from said position detecting means.

5. A beam recording apparatus according to the claim 3, wherein said beam generating means is composed of a semiconductor laser array capable of generating plural beams.

6. A beam recording apparatus comprising:
   beam generating means for generating beams;
   beam deflecting means for deflecting the beams generated by said beam generating means;
   a recording member for receiving the beams deflected by said deflecting means to be irradiated thereby;
   beam detecting means for simultaneously detecting said plural beams deflected by said beam deflecting means and for generating clock signals based on the detection of a specific one of said plural beams;
   storage means containing therein values corresponding to time delays during which associated beams reach predetermined positions; and
   control means for controlling a modulation of an associated one of the beams in response to a signal which is generated at a time when the clock signals generated after the detection of the specific beam by said beam detecting means coincide in number with an associated one of the values contained in said storage means.

* * * * *

UNITED STATES PATENT AND TRADEMARK OFFICE
CERTIFICATE OF CORRECTION

PATENT NO. : 4,423,426
DATED : December 27, 1983
INVENTOR(S) : TAKASHI KITAMURA

It is certified that error appears in the above-identified patent and that said Letters Patent is hereby corrected as shown below:

Column 1

Line 42, change "Pl" to --P$\ell$--.

Column 5

Line 5, delete "to", second occurrence.

Line 21, change "divider 93" to --dividers 93-1 through 93-4--.

Signed and Sealed this

Twenty-fourth Day of April 1984

[SEAL]

Attest:

GERALD J. MOSSINGHOFF

Attesting Officer    Commissioner of Patents and Trademarks